W. G. SCHAEFFER.
PISTON COUPLING.
APPLICATION FILED JAN. 18, 1910.
972,651.
Patented Oct. 11, 1910.
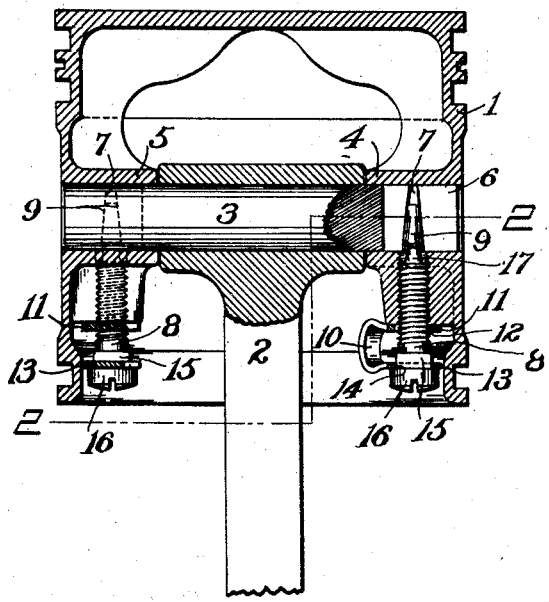
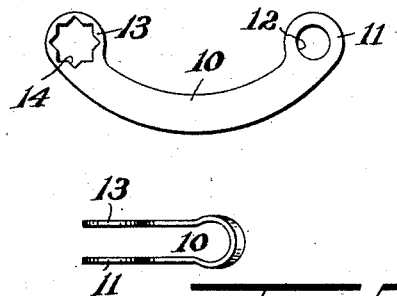
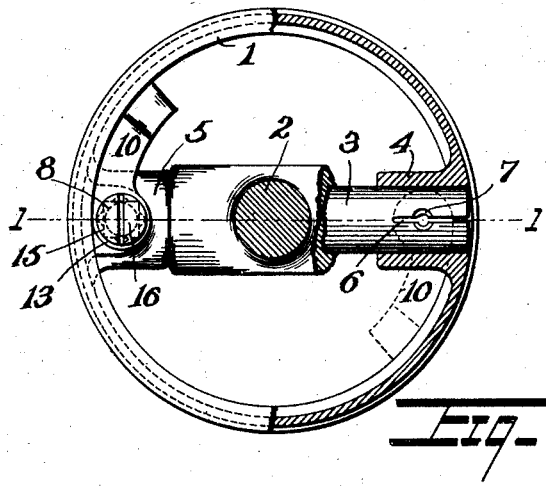
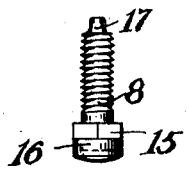
William G. Schaeffer,
Inventor
Witnesses
By
Attorney

UNITED STATES PATENT OFFICE.

WILLIAM G. SCHAEFFER, OF READING, PENNSYLVANIA, ASSIGNOR TO READING STANDARD COMPANY, OF READING, PENNSYLVANIA, A CORPORATION OF PENNSYLVANIA.

PISTON-COUPLING.

972,651.     Specification of Letters Patent.     Patented Oct. 11, 1910.

Application filed January 18, 1910. Serial No. 538,609.

*To all whom it may concern:*

Be it known that I, WILLIAM G. SCHAEFFER, a citizen of the United States, and a resident of the city of Reading, in the county of Berks and State of Pennsylvania, have invented certain new and useful Improvements in Piston-Couplings, of which the following is a specification.

My invention relates to wrist-pin connections for piston rods or the like, and my object is to provide a locking means for said pin that will insure its retention in proper position and one that will withstand the loosening tendency of a rapidly reciprocated piston or cross-head.

My invention is fully described in connection with the accompanying drawings and the novel features are specifically pointed out in the subjoined claims.

Figure 1 is a sectional elevation, mainly on the line 1—1 of Fig. 2, of a piston rod connection embodying my invention, one end of the wrist-pin being shown in cross-section. Fig. 2 is a bottom view, partly in section on the line 2—2 of Fig. 1. Figs. 3, 4 and 5 are detail views of the set screw- and lock-spring employed.

In the drawings I have indicated a piston of a gasolene engine, which is subject to severe shocks and rapid reciprocating motion imparted by the successive explosions of the operating gases in the cylinder head. These heavy vibrations require a special locking means for the wrist-pin employed to connect the piston rod to the piston, any derangement, or disconnection of which pin while in operation, would cause serious damage.

Referring to the drawings, 1 represents a piston, and 2 a piston rod connected thereto by means of a wrist-pin 3 engaging apertured lugs 4 and 5 formed in the piston. This wrist-pin, as shown, is split at each end by means of a longitudinal slot 6, and intermediate the length of this slot is formed a wedge-pin guide-way 7. The lugs 4 and 5 are provided with screw-threaded openings having set-screws 8 therein in alinement with the guide-ways 7. Taper-pins 9 in said ways 7 are forced inward by the set-screws to wedge apart the split ends of the wrist-pin and secure them in the lugs 4 and 5. To lock these set-screws in adjusted position and prevent their working loose and falling into the crank casing where they would cause serious damage, I provide a lock-spring device as shown in Figs. 4 and 5. This lock-spring, as shown, consists of a U-shaped sheet-metal spring 10, bent up from the sheet-metal blank shown in Fig. 4, one member 11 of which is formed with an aperture 12 adapted to be strung upon the threaded portion of the set-screw 8, and the other member 13 of which has a dog-toothed or serrated opening 14 arranged to engage an angled portion 15 of said set-screw in an adjusted position, the U-shaped part of said spring 10 being adapted to contact with the piston 1 and prevent any disengaging or loosening turning of said set-screw. This set-screw, as stated, has an angled or squared portion 15 beneath the headed portion 16 thereof, and is also preferably provided with the reduced end 17 to engage the taper-pin.

The application of my improved locking device will be readily understood in connection with the drawings. The piston rod having been placed in position in the piston, and the wrist-pin entered with the guide-ways 7 in alinement with the set-screw openings, and the taper-pins 9 inserted in said ways, the set-screws 8 with my improved lock-springs strung thereon, are entered in the lugs 4 and 5 respectively. By depressing these lock-springs to bring the ends 11 and 13 close together, these set-screws may be turned until the taper-pins wedge apart the split ends of the wrist-pin to lock them in said lugs, and the lock-springs upon being released will engage the angled portion 15 of the adjusted set-screws by means of the dog-toothed apertures 14. The U-shaped extension of said springs bear against the piston, positively preventing any rearward or loosening turning of said set-screws and insuring a positive and permanent locking means for said wrist-pin and one that will withstand the severe vibrations subjected to it.

What I claim is:—

1. A wrist-pin connection comprising a wrist-pin having a longitudinal slot with an intermediate wedge-pin guide-way, a taper-pin in said way with a set-screw therefor having an angled head portion, and a U-shaped lock-spring, one member of which is strung upon the bolt and the other member of which closely engages the angled head portion thereof.

2. A wrist-pin connection comprising a wrist-pin having a longitudinal slot with an intermediate wedge-pin guide-way, a taper-pin in said way with a set-screw therefor having an angled head portion, and a U-shaped lock-spring, one member of which is strung upon the bolt and the other member of which is provided with an angled opening adapted to engage the angled head portion of the bolt in an adjusted position.

3. In a wrist-pin connection, a piston having a wrist-pin aperture with a set-screw opening thereto, a wrist-pin entered in said aperture and provided with a longitudinal slot having a wedge-pin guide-way intermediate the length thereof, a taper-pin in said way, a set-screw in said opening adapted to engage said taper-pin, said set-screw having an angled head portion, a U-shaped lock-spring, one member of which is strung upon said set-screw, the other member of which closely engages the angled head portion of said screw, and the U-shaped intermediate portion of which bears against the piston to prevent a reverse turning movement of the adjusted screw.

In testimony whereof, I affix my signature, in the presence of two witnesses.

WM. G. SCHAEFFER.

Witnesses:
D. M. STEWART,
W. G. STEWART.